United States Patent [19]
Lake

[11] 3,936,258
[45] Feb. 3, 1976

[54] CALENDER

[75] Inventor: Charles G. Lake, Akron, Ohio

[73] Assignee: Intercole Automation, Inc., Cleveland, Ohio

[22] Filed: Jan. 30, 1974

[21] Appl. No.: 437,771

[52] U.S. Cl. .............. 425/135; 425/DIG. 235; 72/8; 425/224; 425/367
[51] Int. Cl.² .. B29C 15/00; B29D 7/14; B29H 3/00
[58] Field of Search ........... 425/DIG. 235, 194, 141, 425/135, 136, 151, 367, 368, 163, 140, 335, 337, 224; 60/403; 164/282; 100/170; 72/8, 21; 65/109, 278, 279

[56] References Cited
UNITED STATES PATENTS

| | | | |
|---|---|---|---|
| 3,263,284 | 8/1966 | Orr et al. ........................... 164/282 |
| 3,389,588 | 6/1968 | Reinhardt et al. ...................... 72/8 |
| 3,435,648 | 4/1969 | Bergstrom et al. ................. 425/136 |
| 3,492,845 | 2/1970 | Nomura .................................... 72/8 |
| 3,516,273 | 6/1970 | Stone .................................... 72/21 |
| 3,566,638 | 3/1971 | Herbst .................................... 72/8 |
| 3,578,766 | 5/1971 | Diolot .............................. 100/170 |
| 3,587,267 | 6/1971 | Townsend ............................. 72/21 |
| 3,753,350 | 8/1973 | Nott .................................... 60/403 |
| 3,850,015 | 11/1974 | Anderson ............................. 72/31 |

Primary Examiner—Francis S. Husar
Assistant Examiner—R. J. Charvat
Attorney, Agent, or Firm—Watts, Hoffmann, Fisher & Heinke Co.

[57] ABSTRACT

A calender especially suitable for use with rubber and plastic material. One of two opposed rolls is movable toward and away from the other through direct action of long-stroke fluid actuators that move the bearing boxes on opposite ends of the movable roll. Roll spacing is directly sensed by position-sensitive transducers acting between opposed bearing boxes and responsive to the relative roll positions. The transducers signal changes and initiate correction to retain roll spacing at a set distance. The fluid actuators are controlled to separate the rolls upon power failure and to prevent roll contact in the event work product is not between the rolls.

7 Claims, 12 Drawing Figures

# CALENDER

BACKGROUND OF THE INVENTION

1. Field of the Invention.

This invention relates to calenders, and more particularly to calender roll positioning.

2. Prior Art.

Calenders are used in the rubber and plastic industry to form or process sheet or web stock. Web or sheet thickness is controlled by the spacing between two opposed calender rolls, one of which is adjustably mounted so that the spacing can be varied. Roll positioning means that will accurately locate the rolls and adjust the roll pressure to maintain a spacing are desired to obtain uniform thickness of the stock. The product in some arrangements is sensed downstream from the calender rolls and adjustments made in the roll spacing to compensate for factors such as machine distortion that affect product thickness. A measurement or condition change indicative of the positional relationship between the rolls may be used to initiate and control an adjustment in the roll spacing.

Certain arrangements for adjusting one roll of a calender or mill for control of workpiece thickness are already known, but in one way or another, do not satisfy all presently desired objectives. Typical systems utilize power screws, fluid actuators, or combinations where a screw and fluid actuator act in series to position a movable roll. Spacing is controlled in many instances from machine and/or workpiece sensors, such as position-sensitive transducers and thickness gauges, and product thickness has also been controlled by the speed of a calender pick off. Feedback loops are used to facilitate continued adjustment of roll spacing or other operating parameters to enhance control over product thickness. Some examples of known systems of the above type are shown in U.S. Pat. Nos. 3,479,951; 3,531,827; and 3,600,747.

SUMMARY OF THE INVENTION

In the present calender, a roll is provided that is adjustably positioned relative to an opposed second roll (typically in a fixed position) and moved through its entire range of movement by the mechanism of fluid actuators. These actuators are comprised of long-stroke cylinder and piston type fluid motors for providing substantial spacing between the two rolls. The cylinders permit rapid roll movement, as in retraction of the movable roll in the event of power failure or other emergency; yet they can be adjusted slowly and accurately, as often as necessary without significant wear with extremely short response time, and without backlash, to adjust the roll spacing to a desired gap and to maintain uniform thickness of the product.

Position-sensitive transducers are located with respect to the movable roll and the adjacent roll to sense the roll spacing and to produce a feedback signal that, along with a primary setting for the roll spacing, controls the fluid supply to the adjusting fluid actuators. The primary setting is operator-established and may be varied during operation by input from a material thickness sensor. High accuracy plus convenience in construction are obtained by locating the transducers to sense between reference locations on the bearing boxes of the opposed rolls. More ideally but less conveniently, a transducer can be located to sense an actual surface of one or both adjacent rolls. In either arrangement, an accurate, direct, indication of roll spacing is obtained, independent of any distortion of the frame or force-transmitting parts, and independent from effects of wear or backlash inherent with power screws.

A hydraulic system for operating the fluid actuators that adjust and position the movable roll includes important control features for preventing mutual roll contact and resulting damage in use. In combination with the roll position sensors, the hydraulic system automatically stops the advance of the movable roll towards the second roll if no load is applied between the two when the movable roll reaches a predetermined position proximate the other. The hydraulic system is also arranged so that if there is a power failure, the movable roll is automatically retracted from the working position adjacent the other roll.

It will be understood that in the absence of power and continual roll rotation and the accompanying separation force provided by work resistance, the pressure applied to the movable roll would otherwise force it through the material and into contact with the adjacent roll. In power screw adjustment systems, typically a separate arrangement is required to provide a drive to retract the screw in the absence of the normal power input.

The present invention provides a particularly advantageous arrangement for supporting the bearing boxes of the movable roll and for locating the position transducers, to assure that the movable roll is accurately positioned relative to the fixed roll, and to be certain that the actual relationship is accurately sensed. The bearing boxes of the movable roll are urged into cooperable relationship with the fluid actuator piston rod in a manner that resists the tendency of the bearings to cock about the roll axis under the forces to which the roll is subjected in use, as by the resistance of the bank of material being calendered and by the tendency of the movable roll to climb or move in the direction of rotation. Resisting this tendency is particularly important in the present invention, because the position-sensitive transducers are advantageously carried by the bearing boxes. Since any change registered will be interpreted as a change in spacing between the two rolls, and a canting of the bearing box not reflected by a change in roll axis position would introduce an inaccuracy.

In one preferred embodiment, two position-sensitive transducers—specifically, linear voltage differential transformers (LVDTs)—are used in connection with each bearing box, on opposite lateral sides of the rotational axis of the adjustable roll. By averaging the signal outputs, any inaccuracy due to bearing box canting will be minimized. In a second embodiment an LVDT is used between two shaft portions of the rolls in the place of the roll axes, adjacent the inwardly facing side of the bearing boxes, on each side of the rolls and is essentially unaffected by bearing or bearing box factors.

The bearing structure used for supporting the opposed rolls is constructed and arranged to eliminate clearance between the bearing box, bearings and roll journal at operating temperature. As a result, sensing the relationship between the bearing boxes of the fixed and movable rolls will give an indication equivalent to the relationship between the actual roll surfaces.

A further feature is the use of a roller bearing construction between the bearing blocks that support the movable roll and the guiding surfaces of the supporting frame to materially reduce the static friction that must be overcome when the movable roll is adjusted in its spacing from the fixed roll. Conventionally acceptable breakaway friction would prevent attaining the accuracies otherwise available with the present invention, because of the over travel that results when forces as heretofore required are used to initiate roll movement.

It is a principal object of this invention to provide an improved calender for processing rubber and plastic material in which all roll spacing movement and working pressure is provided by long-stroke fluid actuators that provide fast movement, quick response and accurate positioning; in which the spacing between two opposed rolls one of which is adjustable is sensed directly by position-sensitive transducers for purposes of producing a feedback signal used in controlling the roll spacing; in which safety features are provided to prevent roll-to-roll contact; and in which bearing constructions for journalling the rolls and for accommodating roll adjustment facilitate high accurate roll spacing.

The above and other objects, features and advantages of this invention will become more apparent as the invention becomes better understood from the detailed description that follows, when considered in connection with the accompanying drawings.

DETAILED DESCRIPTION OF A PREFERRED EMBODIMENT

GENERAL ARRANGEMENT

Figure 1:
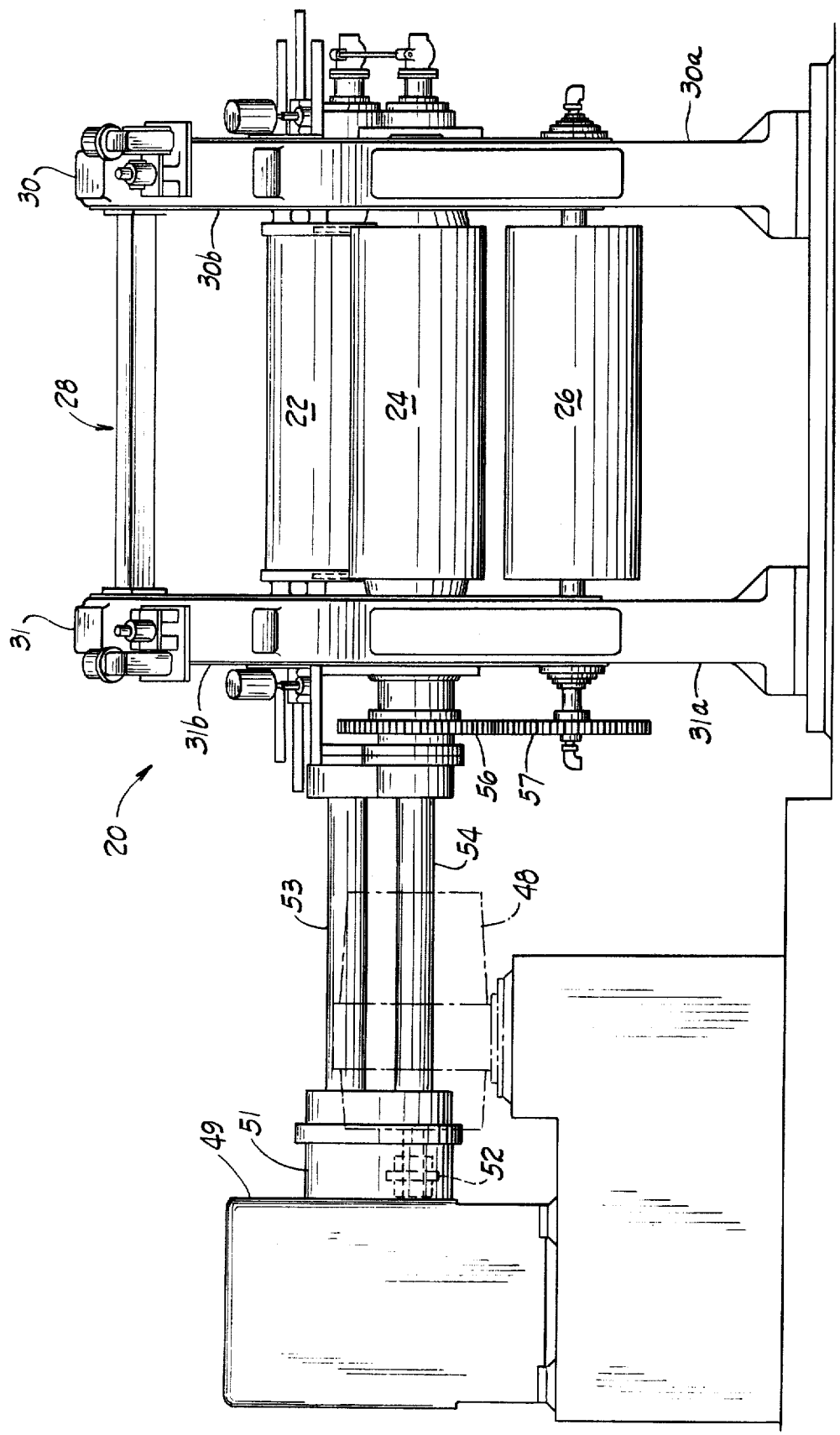
FIG. 1 is a front elevational view of a calender embodying the present invention.
Figure 2:
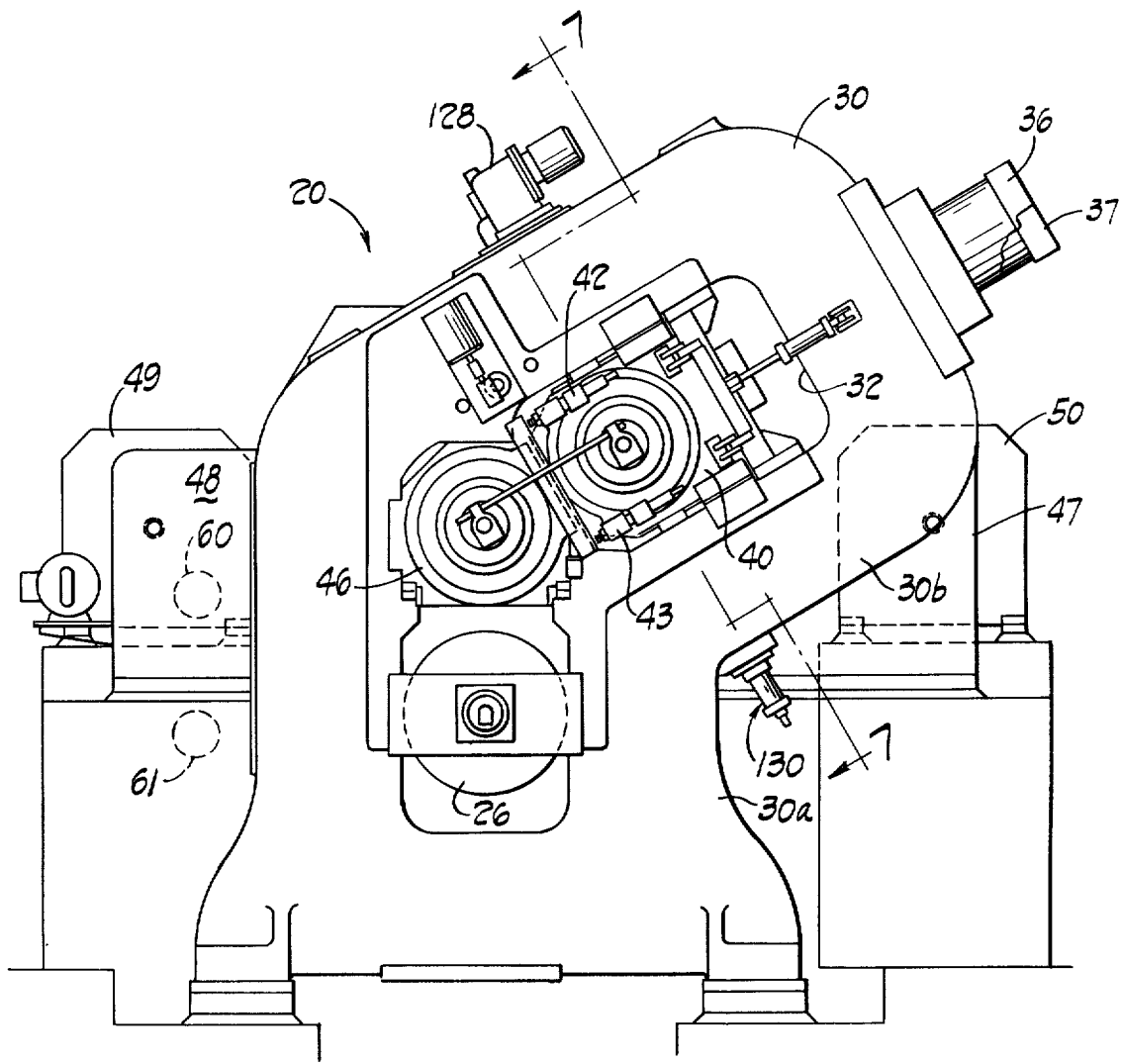
FIG. 2 is a side elevational view of the calender of FIG. 1 with additional structure for winding a calendered web.
Figure 2A:
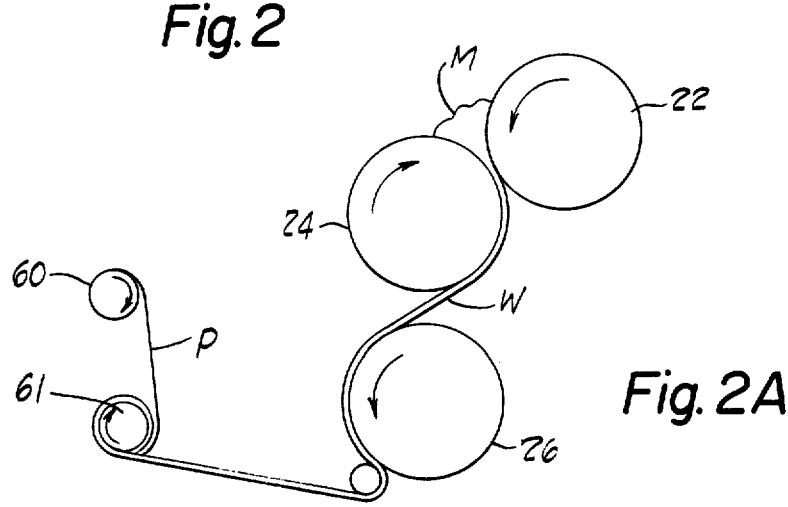
FIG. 2A is a diagrammatic view of the roll arrangement of FIG. 2 showing the manner in which a web is formed.

A calender 20 embodying the present invention is shown in the assembly views of FIGS. 1 and 2, and is especially suitable for calendering a sheet or forming a web W from a bank of material M such as rubber or plastic (See FIG. 2A), by compressing the material between calender rolls that are located a distance apart that establishes a desired web thickness.

The calender 20 shown has three rolls, a top roll 22, a center roll 24, and a bottom roll 26, all supported for rotation in a housing or stand 28, comprised principally of two spaced side members or frames 30, 31. In this particular calender, the side members 30, 31 each have a vertical portion 30a, 31a, and an inclined upper portion 30b, 31b to form a so-called inclined calender. A central opening or window 32 is formed in each side member, the window of side member 30 being shown in FIG. 2. The central openings or windows receive bearing boxes that support the opposite ends of the rolls 22, 24, 26 for rotation. The location of the center roll is fixed relative to the frame in this embodiment. The location of the bottom roll is also fixed relative to the frame, but in other embodiments may be movable. The location of the top roll 22 is movable relative to the center roll and frame through the action of two double-acting fluid actuators 36, 37 supported on the upper end of each side member 30, 31, respectively. Each actuator 36, 37 is comprised of a hydraulic cylinder and rod that acts on a bearing box 40 that journals each opposite end of the roll 22 and that is slidable within the windows 32 in a direction that changes the spacing between the rolls 22, 24. The bearing boxes 40 are movable through a range of several inches, the entire movement being provided solely through the mechanism of the hydraulic actuators 36, 37. In addition, these actuators apply working pressure to the bearing boxes and hence the top roll 22, urging it toward the center roll, to apply compressive force to the sheet or web between the rolls. The relative position of the top roll 22 with respect to the center roll 24 is detected by transducers 42, 43 carried by each bearing block 40 and acting against an adjacent fixed bearing box 46 journaling each end of the center roll 24.

The top and center rolls 22, 24 are each driven by an electric motor 27, 28 through a gear drive 49, 50 that has an output shaft 51, 52 connected by a coupling shaft 53, 54 to the top roll and center roll, respectively. The bottom roll 26 is driven from the center roll through two meshing gears 56, 57 carried by the center roll and bottom roll, respectively. The direction of roll rotation is shown diagrammatically by the arrows in FIG. 2A. A separate frame support, not shown is provided for a let off roll 60 of parting material P and for an independently driven wind-up roll 61 for the web received from the calender.

The movable bearing boxes 40 journaling the roll 22 are constructed and arranges to facilitate the accurate adjustment of the spacing between the top roll by providing for a non-clearance bearing support at operating temperatures and a freely slidable relationship with the frame members to materially reduce breakaway friction between the bearings and frame side members during adjustment of the movable roll position relative to the center roll. They are further constructed to accommodate cross axis adjustment of the movable roll by utilizing bearings between the bearing boxes and the force-applying members of the actuators 36, 37 that reduce friction in the direction of cross axis adjustment.

The calender 20 is operated to establish a desired space between the top and center rolls, to produce a desired thickness of a web W. The bottom roll 26 is a cooling drum. The spacing between the top and center rolls is sensed by the transducers 42, 43 and the web thickness may also be sensed automatically by a gauge or may be manually measured. Signals from the transducers and either the gauge or a manual input based on the measured web thickness are introduced into a control circuit that governs the operation of servo valves controlling the fluid supply to the hydraulic actuators 36, 37, to first retain roll spacing at a particular value, but also to adjust that value depending upon the effect the spacing and other parameters have on the web thickness, and thereby achieve a desired thickness. All roll spacing movement, both fine adjustment and major spacing movements, of the roll 22, is by the hydraulic actuators 36, 37.

MOVABLE ROLL SUPPORT AND ADJUSTMENT.

The bearing boxes 40 at each end of the roll 22 are guided within the side members 31, 32 of the housing and are connected to piston rods of the hydraulic actuators 36, 37 for all-hydraulic movement of the roll 22 toward and away from the center roll position. The bearing box structure and mounting arrangement in side members 30, 31 is substantially identical, and only the construction associated with the frame side member 30 will be described in detail.

A piston rod 66 of the hydraulic actuator 36 extends through a bore 68 (FIG. 4) in the side member 30, communicating with the window or central space 32. The piston rod is threadedly secured to an extension rod 70, slidably guided in the bore 68 by a sleeve bearing 72. The distal end of the extension rod 70 carries a threaded retainer or collar 74 that connects the extension rod to the bearing box 40 through an attachment assembly indicated generally at 76. The collar 74 and end of extension rods 70 are contained in the attachment assembly 76 by a flanged retainer ring 78 secured by machine screws 80 to a pressure plate 82. One surface of the pressure plate 82 is comprised of a bronze bearing 83 against which the distal end of the extension rods 70 bears. The other surface of the pressure plate 82 acts as a bearing plate, which cooperates with roller bearings 86, secured to the outer surface of the bearing box 40.

Vertical movement and force to the bearing box is obtained and applied through the connection between the extension rod 70 and the attachment assembly 76 to move the roll and change the spacing through which the work passes. Lateral adjustment of the bearing box within the window 32 to accomplish a cross axis relationship between the movable roll 22 and the center roll 24 is facilitated by the roller bearings 86.

Figure 3:
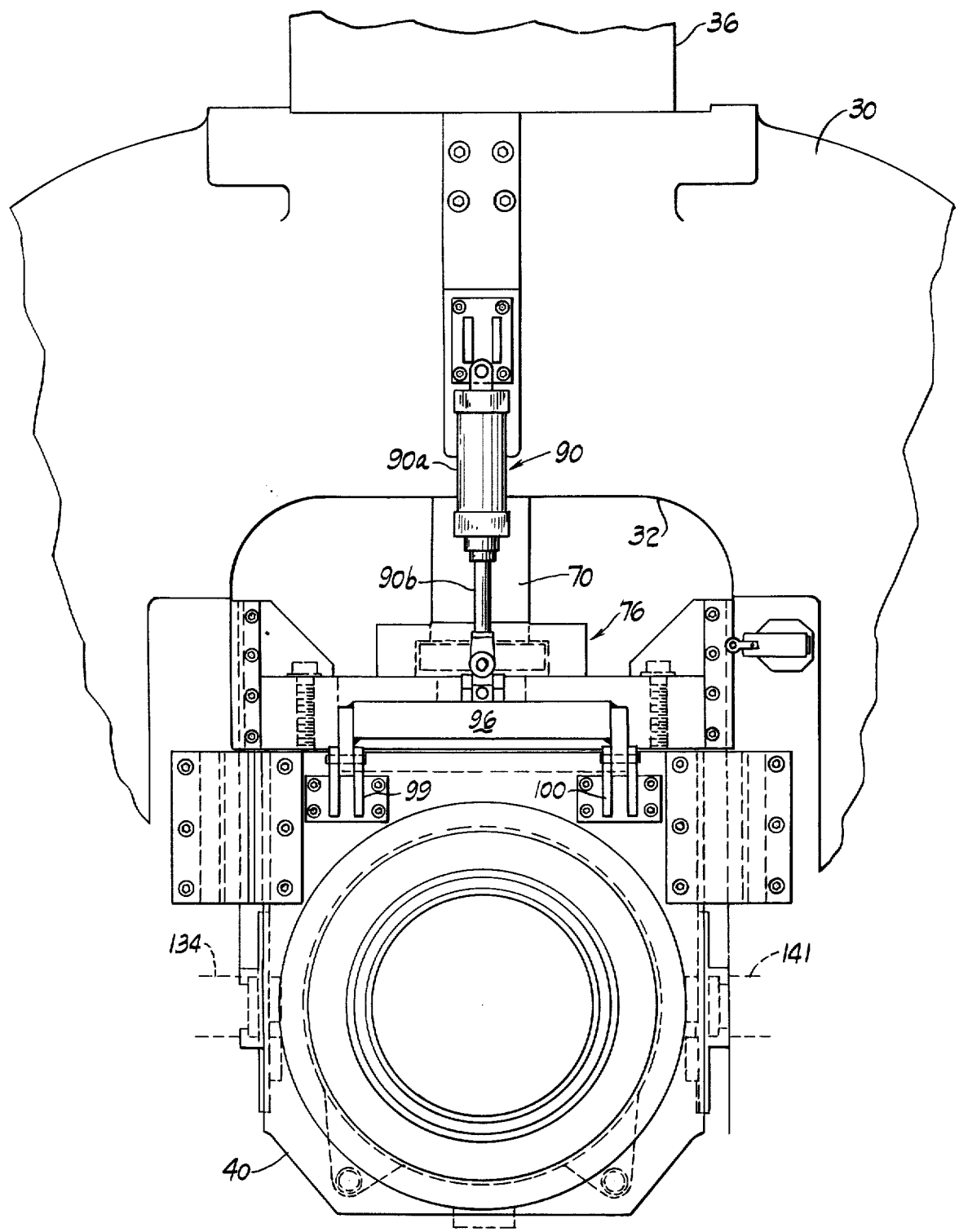
FIG. 3 is a partial and elevational view of the calender of FIG. 2, with parts removed, rotated into a vertical orientation from the incline of FIG. 2, showing structural details of the movable roll mounting structure.
Figure 4:
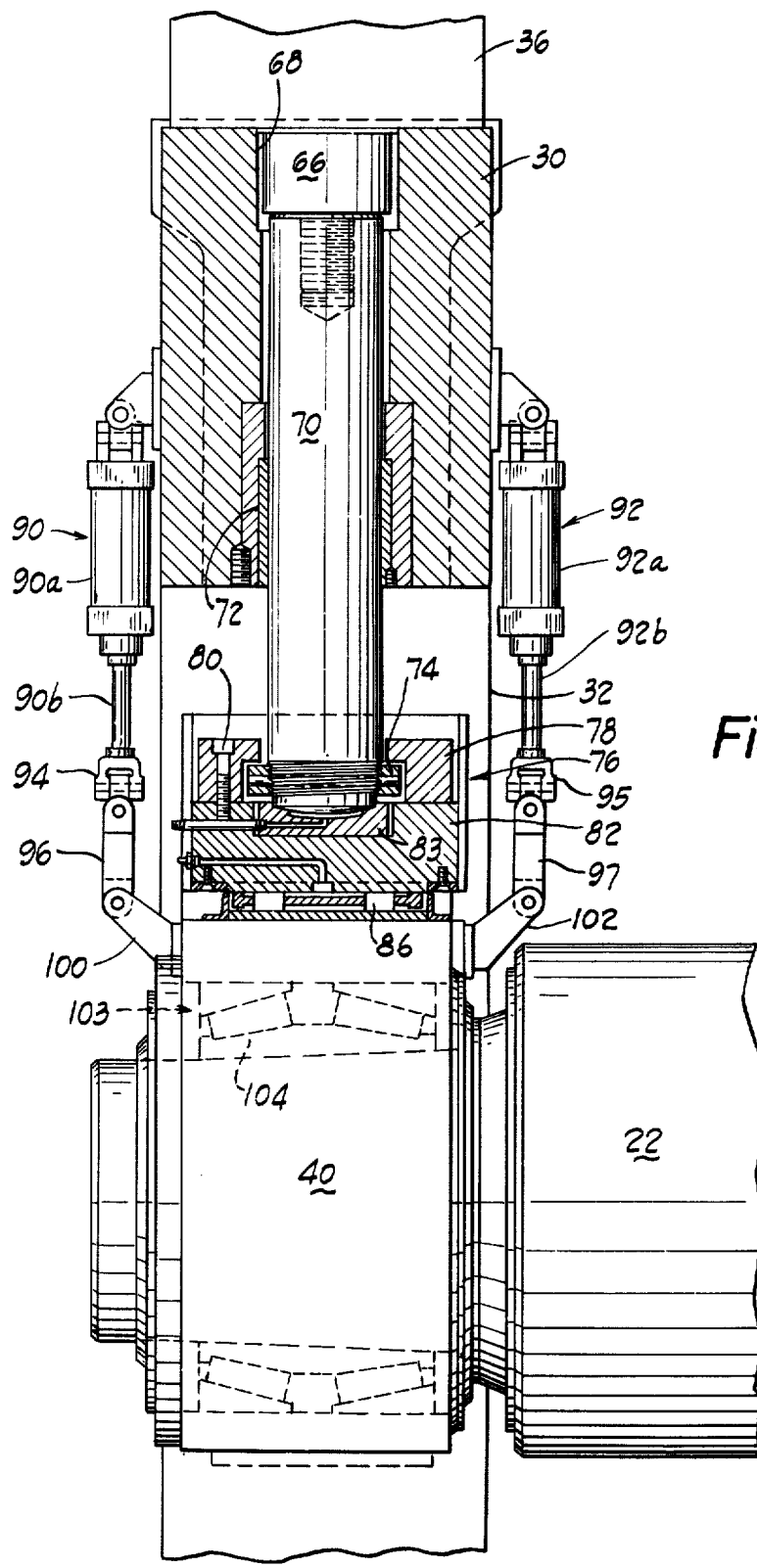
FIG. 4 is a partial view of the calender of FIG. 1, partly in elevation, illustrating the interconnection between the movable roll bearing box and the hydraulic actuator that positions the movable roll.

The bearing box 40 is biased against the attachment assembly 76 and hence against the extension rod 70 from two transversely spaced locations along an edge (the upper edge in the orientation shown) of each side face of the bearing box by hydraulic actuators 90, 92. As shown in FIGS. 3 and 4, the actuators are comprised of cylinders 90a, 92a, each secured to an opposite side of the frame side member 30, and a piston rod 90b, 92b, connected respectively by clevises 94, 95 to yokes 96, 97 secured to the bearing box. The yoke 96 is pinned to two spaced brackets 99, 100 on the outside surface of the bearing box 40, and the yoke 97 is similarly pinned to two brackets on the inside surface, one of which is shown at 102. The hydraulic actuators 90, 92 are operated to yieldably bias the bearing box 40 toward the attachment assembly 66. This biasing force resists the tendency of the bearing box to cock about the rotational axis of the roll, when the roll is under load and subjected to forces that tend to cause the roll to ride up the work product in the direction of rolling.

To assure the accurate location of the roll axis with respect to the bearing box 40, the roll neck is journaled in a precision roller bearing 103 with a cone 104 that is adjusted so that, at the operating temperature of the roll and bearing, there is no clearance within the bearing and therefore the position of the roll relative to the bearing block is precise and known. By way of example, a preferred embodiment incorporates a Timken two-row tapered-bore roller bearing identified as number 3-130 precision bearing.

ROLL POSITION SENSING

Figure 5:
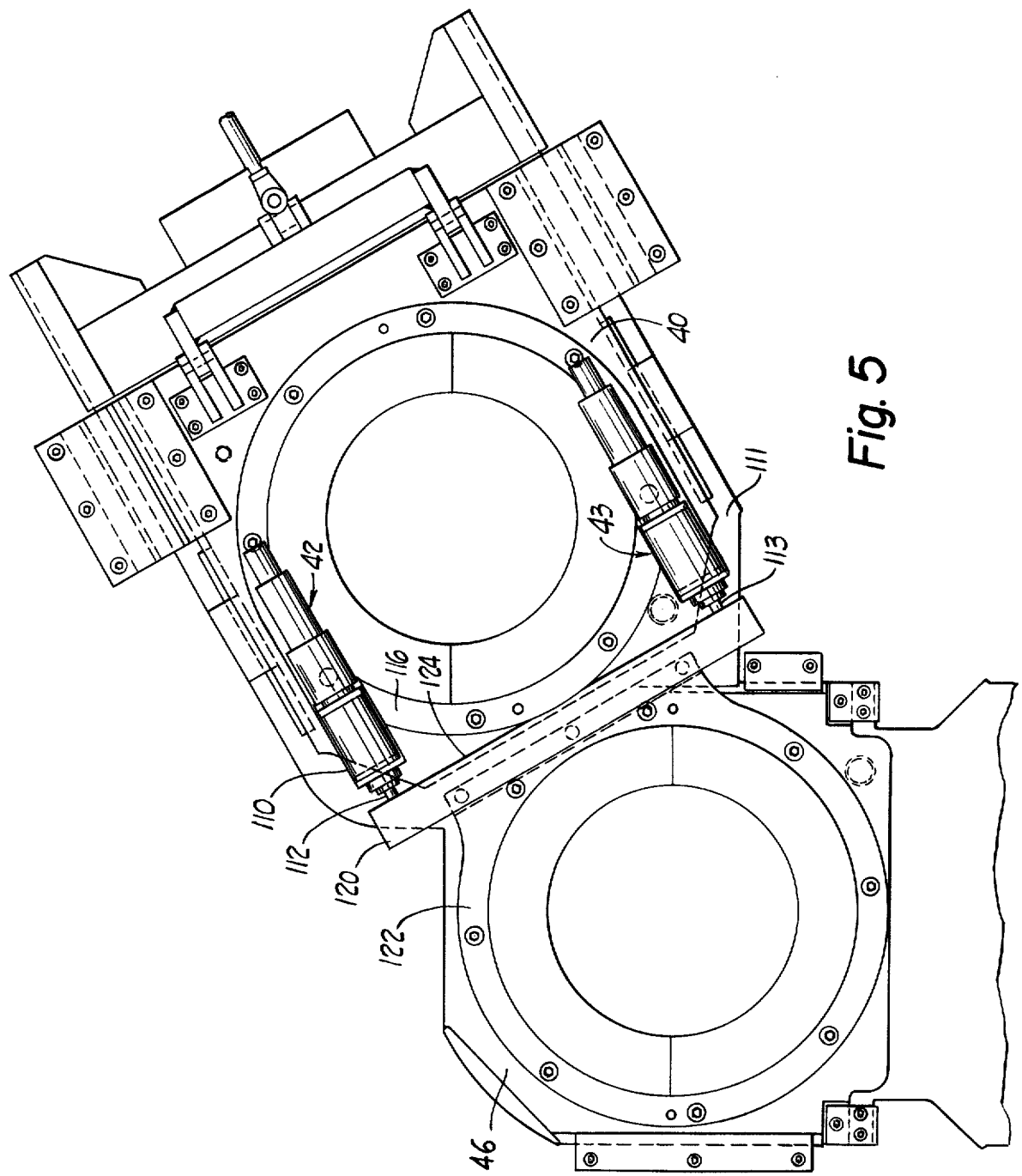
FIG. 5 is a partial end elevational view of the calender of FIG. 2, illustrating the arrangement of the LVDTs.
Figure 6:
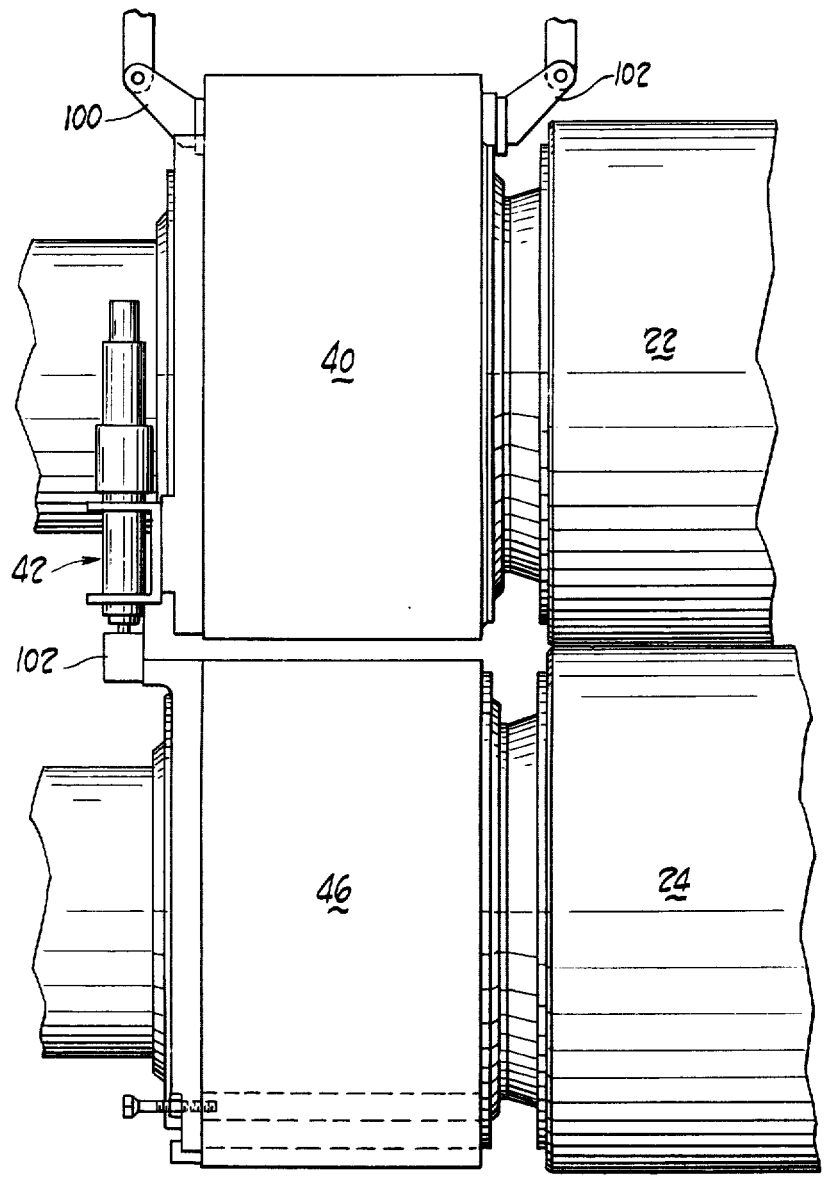
FIG. 6 is a partial front elevational view of the structure shown in FIG. 5.
Figure 11:
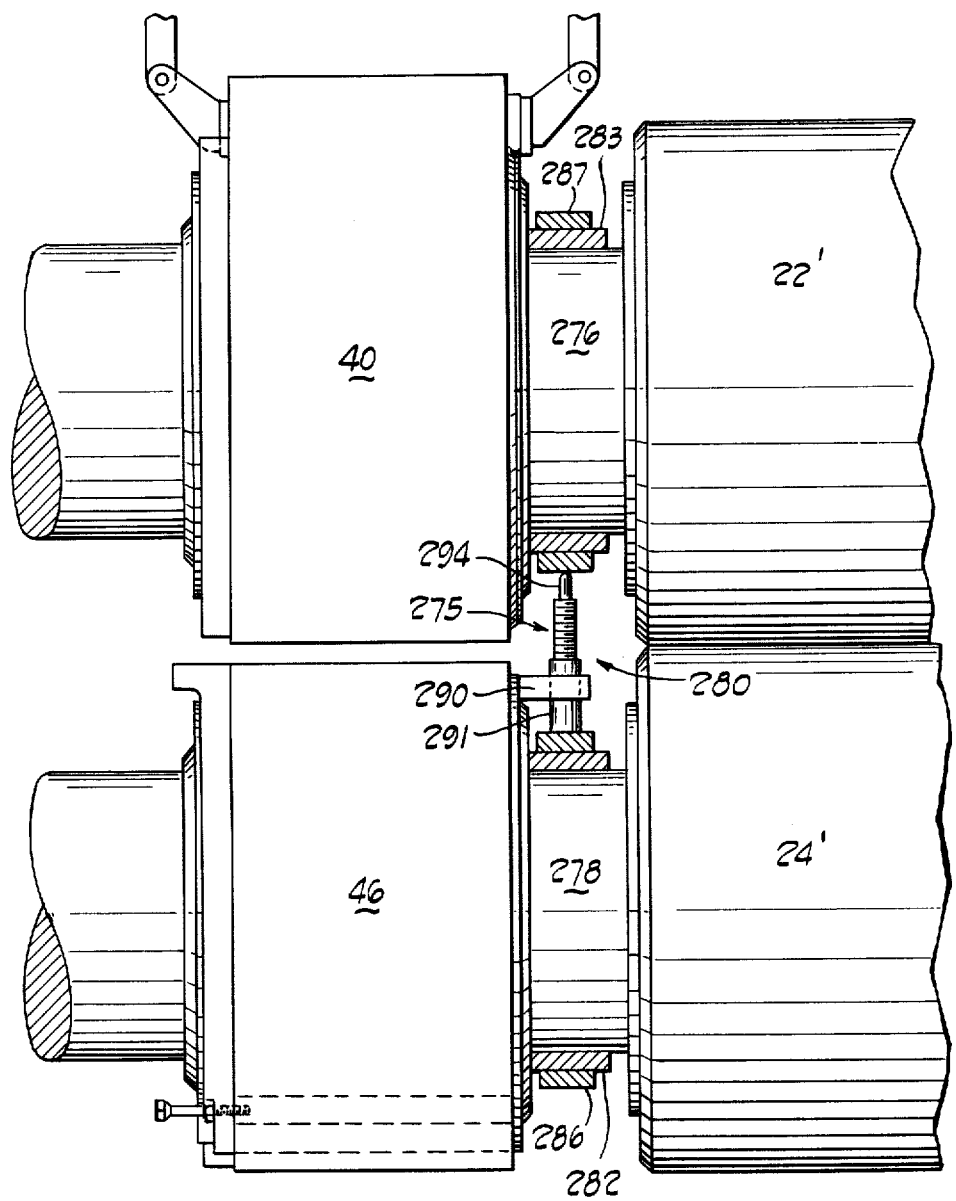
FIG. 11 is a partial front elevational view similar to FIG. 6 but showing a different embodiment in which a transducer is positioned between opposed roll surfaces.

Accurate spacing between the rolls 22, 24 for controlling product thickness is achieved by continuously sensing the distance between the bearing boxes of the movable top roll and the fixed center roll, and generating a signal responsive to any change in the distance. Sensing is accomplished with position transducers, viz., linear voltage differential transformers (LVDTs) 42, 43 directly sensitive to the distance between reference surfaces on the bearing boxes of the rolls 22, 24. See FIGS. 5 and 6. The LVDTs are located and supported to compensate for housing or frame deflection in the direction of force application. The signals generated by the LVDTs are used in a control circuit that operates servo valves controlling the flow of fluid to the hydraulic actuators 36, 37 that determine the movable roll position. An alternative arrangment for mounting LVDTs is shown in FIG. 11 and will be described separately.

The two LVDTs 42, 43 are secured to the outwardly facing end surface of each bearing box 40 of the movable roll 22. Each LVDT 42, 43 has respectively a housing 110, 111 and a movable core (not shown) within the housing, connected for movement to a rod 112, 113 which extends from the housing and is rectilinearly reciprocal and yieldably biased to an outward position. Each housing 110, 111 is secured to a bearing retainer 116 of the bearing box 40, one on each opposite side of the rotational axis of the roll 22. Each housing is accurately positioned by locating dowels or pins and is oriented so that the direction of reciprocal movement of the rods is parallel to the path of the bearing box movement in the side frame.

A fixed reference bar 120 is secured to a bearing retainer 122 of each bearing box 46. The reference bar extends across the bearing box 46 adjacent to the box 40, transversely of the rolls and in a direction perpendicular to the direction in which the roll 22 is moved to change the roll gap, and is accurately located by dowels or pins. A flat reference surface 124 of the reference bar 120 faces toward the bearing box 40, and extends a width greater than the distance between the LVDTs 42 and 43, to accommodate relative movement, in the plane of the reference surface, between the bearing boxes 40 and 46, as is occasioned by cross axis adjustment of the movable roll.

Upon movement of the bearing boxes 40, as from direct operation of the actuators 36, 37 or as might be occasioned by movement of the roll 22 due, for example, to a change in the resistance of the work product, the LVDT housings 110, 111 on each bearing box 40 will move relative to the respective reference bars 120. The rods 112, 113, being biased against the adjacent reference bar, move outward or inward, depending upon the direction of movement of the bearing boxes 40, causing a change in the position of the core within each LVDT. This creates an electrical signal, indicative of the change in position of the bearing boxes and hence indicative of a change in the roll spacing is accurate, because there is no clearance in the bearings journaling the rolls.

Signals produced from both LVDTs on one side of the roll, i.e., associated with one bearing box, are averaged, and the averaged output controls the respective actuator 36, 37, which adjusts the bearing box upon which the LVDTs are carried. By averaging the signal output from LVDTs on opposite sides of the roll axis, any apparent change in spacing due to a cocking or tilting of the bearing box is minimized or eliminated. Further, by averaging the output from both LVDTs, any change from a shift longitudinally along the reference bar surface due to an adjustment of the movable roll to a cross axis position, or any change in readings which might be occasioned by a failure of the reference bar to be absolutely perpendicular to the direction of bearing box movement, will be compensated for.

BEARING GUIDES AND CROSS AXIS ADJUSTMENT FOR MOVABLE ROLL BEARING BOXES

The ability to obtain accurate roll spacing is enhanced by bearing assemblies interposed between the bearing boxes 40 and adjustable guides on opposite lateral sides of the bearing boxes, which locate the bearing boxes laterally within the frame openings.

Roll deflections are compensated by crossing the center line of the roll 22 with respect to the center line of the roll 24, establishing a cross axis adjustment. This is accomplished by positioning each bearing box 40 slightly to one side, laterally, of the rotational axis of the fixed roll at one end, and on the opposite side of the fixed axis on the opposite end. Typically, the maximum adjustment necessary will be no greater than approximately one inch. This arrangement will reduce the variation in roll gap across the width of rolls caused by roll bending, and the basic mechanism for accomplishing this adjustment is known. In the present embodiment, this adjustment is obtained through a drive motor and screw arrangement indicated generally at 128 at one edge of each side member 30, 31, and a cylinder and piston assembly indicated generally at 130, on the opposite side edge of each side member. See FIGS. 1, 2 and 7. The mechanism 128 includes a gear motor 132 that operates a threaded jack 133, connected to an adjustment ram 134 slidable within the respective side frame member 30, 31. The ram 134 terminates in a thrust assembly 137 that acts against one side of the bearing box 40, serving to position the box laterally and also to guide the box in its movement within the side frame or side member established by the action of the actuators 36 or 37.

The cylinder and piston assembly 130 are directly opposite the drive motor and screw assembly 128. The assembly 130 includes a cylinder 139, with a piston rod 140 extending inwardly of the side member 30 or 31. A ram 141 is secured to the end of the piston rod and is slidably supported through the side member. The ram terminates in a thrust assembly 143, which applies a pressure against the bearing box 40 tending to move it in a direction opposed to that of the drive motor and screw assembly 128 and serves as a guide on that side of the bearing box, for the movement of the bearing box relative to the frame, in the direction of roll movement. The cylinder 139 is supplied with hydraulic pressure in a manner that maintains a bias against the one side of the bearing box, but which will permit movement of the piston in response to driven movement of the jack 133. In short, each cylinder and piston assembly 130 serves to yieldably bias the respective bearing box in a direction opposed to that of the positively driven ram 134.

Figure 7:
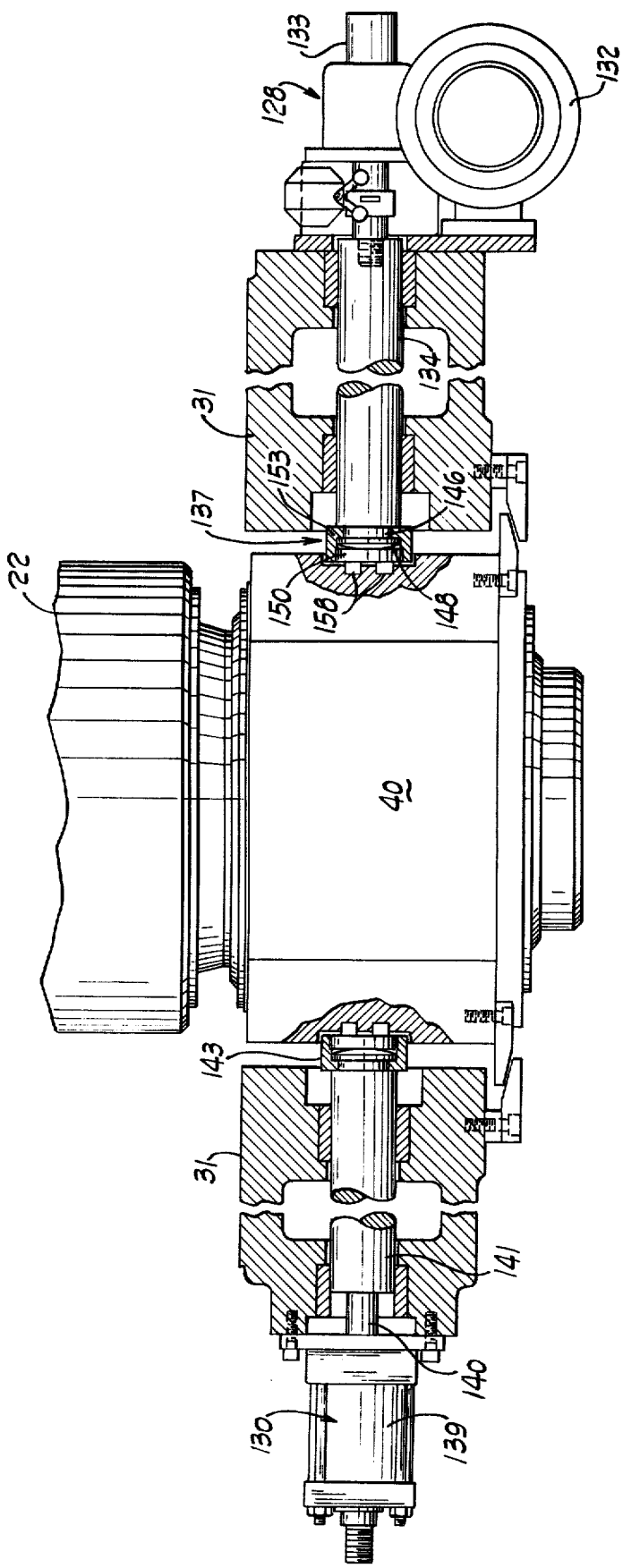
FIG. 7 is a partial elevational and sectional view taken along the line 7—7 of FIG. 2.

Each of the thrust assemblies 137, 143 are identical and only the thrust assembly 137 will be described in detail. As best shown in FIG. 7, the distal end of the ram 134 has a neck 146 and a slightly curved end surface 148. The curved end surface acts against a bearing plate 150. The bearing plate 150 is secured to the end of the ram 134 by a retainer 153 that is flanged to cooperate with the neck 146. This arrangement facilitates the slight cocking of the bearing plate 150 relative to the direction of axial movement of the ram 134, when the bearing box 40 is oriented in a cross axis relationship, i.e., when the sides of the bearing box are not perfectly perpendicular to the direction of ram movement. The retainer 153 and bearing plate 150 are received in a guideway 155 extending along the bearing box in the direction of bearing box movement during adjustment of roll spacing.

In the present arrangement, roller bearings, for example TYCHOWAY roller bearings 158 are carried by the bearing box 40 within the guideway 155, essentially interposed between the bearing box and the bearing plate 150 of the ram 134. These bearings materially reduce the static friction otherwise present between the bearing box and bearing plate 150, which must be overcome when the position of the roll 22 is adjusted. Without such roller bearings a fine adjustment of the movable roll is very difficult to make, because the initial force required to overcome the static friction, i.e., the breakaway force, typically could result in overtravel of the bearing boxes, and hence an incorrect spacing. Thus, the bearings 168 cooperate with the all-hydraulic adjustment feature provided by the hydraulic cylinders 36, 37 to assure accurate positioning of the movable roll relative to the fixed roll.

HYDRAULIC SYSTEM

Figure 8:
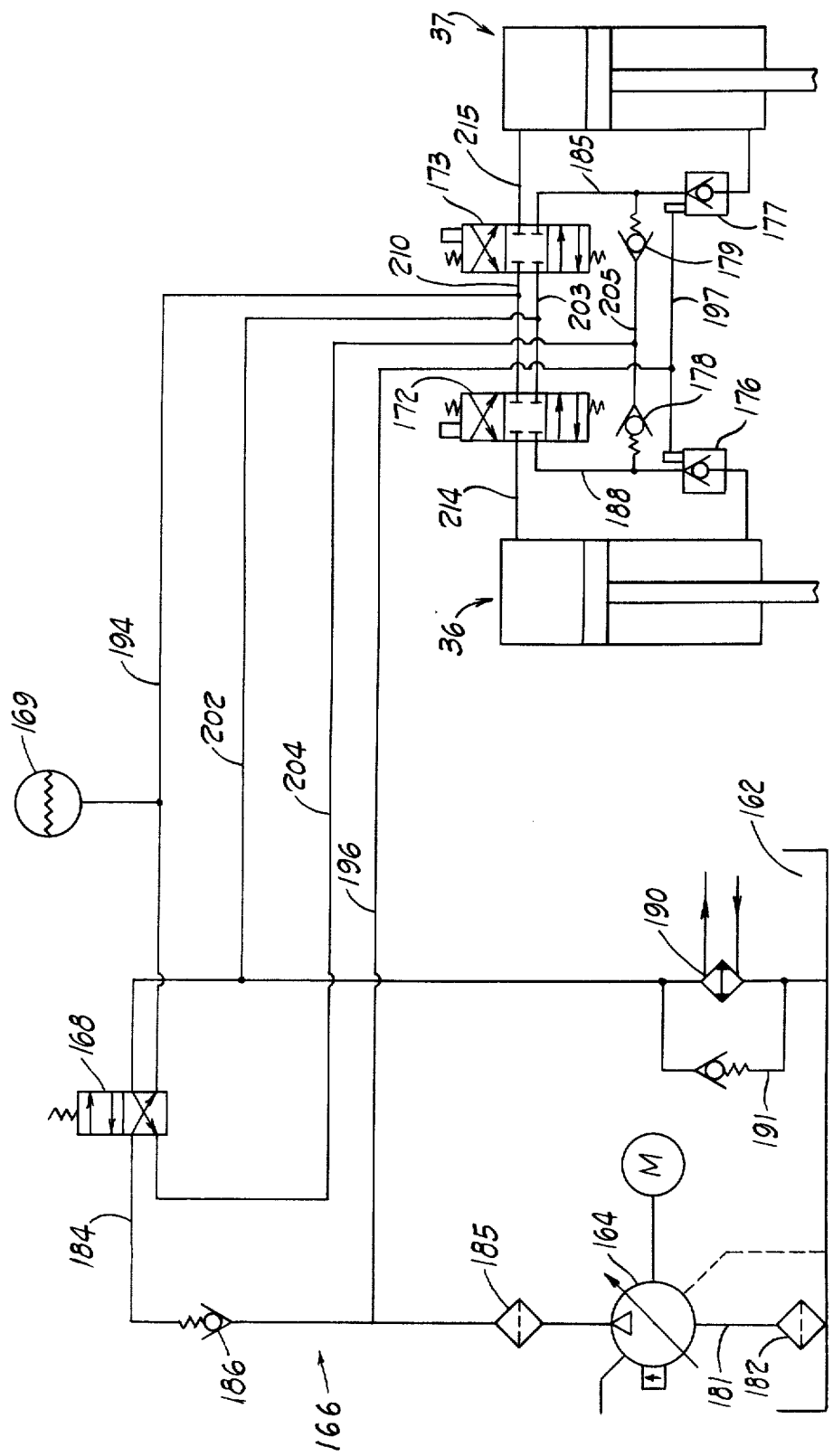
FIG. 8 is a schematic diagram of the hydraulic control circuit for operating the calender and controlling the roll spacing; and, FIG. 9 is a block diagram of the electrical control circuit for operating the calender and controlling the roll spacing.

An hydraulic system is provided, as shown in FIG. 8, to operate the fluid actuators 36, 37 that position the movable roll 22. Provision is made in the system to withdraw the roll 22 from adjacent the roll 24 in the event of a power failure.

The hydraulic system includes a supply tank 162, a motor drive hydraulic pump 164, and a distribution system 166, including an emergency reversing valve 168 and a pressurized emergency fluid reservoir 169, to operate the fluid actuators 36, 37.

As previously indicated, each fluid actuator 36, 37 is a double acting cylinder and piston assembly. Each has associated with it, respectively, a servo valve 172, 173 to control flow to the actuator, check pilots 176, 177 to prevent operation of the actuators in the event of a pressure failure in the hydraulic system, and emergency check valves 178, 179 to provide an alternate flow path for fluid from the emergency reservoir 169 in the event of an electrical power failure.

Considering the distribution system 166 in more detail, a hydraulic line 181 extends from a filter 182 in the tank 162 and supplies fluid to the hydraulic pump 164. A line 184, including a filter 185 receives fluid under pressure from the pump and forms a loop returning to the supply tank. A check valve 186 and the solenoid operated emergency reversing valve 168 are in the loop, as is a heat exchanger 190 connected to a supply of cooling fluid (not shown) and a by-pass 191.

A fluid line 194 is connected to the loop 184 through the emergency reversing valve 168, which is shown in the position it occupies when electrical power is available, i.e., connecting the line 194 to the pressure side of the loop 184. The emergency fluid reservoir 169 is connected to the line 194.

A line 196 connected to the loop 184 in advance of the reversing valve 168 supplies fluid to the check pilot valves 176, 177 through an interconnecting conduit 197. As long as pressure is provided to the check pilots, a line 188 from the servo valve 172 to the piston rod end of actuator 36 and a line 189 from the servo valve 173 to the piston end of actuator 37, will be open to permit operation of the actuators.

A return line 202 is connected from the loop 184 on the downstream side of the valve 168 to a line 203 to the two servo valves 172, 173.

An emergency check line 204 is connected from the valve 168 to a line 205, which is connected through check valves 178, 179 to the actuator lines 188, 189, respectively, to provide an alternative flow path for emergency fluid pressure to the piston rod end of each actuator.

The line 194 from the valve 168 connects to a line 210, which interconnects the solenoid operated servo valves 172, 173. The servo valves, in addition to being connected to the lines 188, 189 associated with the piston rod end of the cylinders, are also connected to lines 214, 215 to the cylinder end of the actuators. The two servo valves are each constructed to control the flow and direction of hydraulic fluid to the actuators 36, 37, with an intermediate shut off position. Accordingly, they will control the speed, direction and extent of piston movement of the actuators in response to electrical signal input.

In normal operation, the reversing valve will be in the position shown, so that fluid pressure from the pump 164 supplied through the line 184 will be directed through the line 194 and through the check pilot line 196. The check pilot line will keep the flow passages through the lines 188, 189 open and, depending upon the position of the servo valves 172, 173, the pistons of the actuators will be maintained in a constant position, or adjusted inward or outward of the cylinders to move the associated roll 22. The manner in which the speed and direction of the movement is controlled through the servo valves will be explained in more detail subsequently.

In the event of a power failure, the rolls would stop rotating and residual pressure, which is resisted to a lesser extent in the absence of roll rotation and work feed, would tend to drive the rolls together, cutting the work and marring the roll surfaces. To prevent that, the reversing valve 168 is constructed to reverse its position in the absence of electrical power. Thus, it would move to the position in which the ports would connect the fluid pressure line 194 with the emergency check line 204. Fluid under pressure, for example, one quart of fluid under a pressure of 700 psi., from the emergency fluid reservoir 169 would then flow through valve 168 and the emergency check line 204, through the emergency check valves 178, 179, through the pilot check valves 176, 177, and into the piston rod end of the actuators, causing the piston rods to be withdrawn a slight distance, sufficient to keep the rolls separated. Flow of fluid from the head end of the cylinders is permitted in such a situation because the servo valves 172, 173 are constructed with permanent magnets biasing the valves to a condition in which the head end conduits 214, 215 are connected to the return line 202. The permanent magnet bias is, of course, overcome by the solenoid actuation that controls the servo valves during the presence of electrical power.

After a power failure, upon the return of power, the actuator pistons are in a position different from that to which they had been set during operation. The electrical control circuit is arranged to bring the control system into balance, at the withdrawn position of the piston rods.

ROLL SPACING CONTROL

Positioning the movable roll by adjustment of the servo valves 172, 173 is controlled through an electrical control system that produces a roll positioning signal from either a manual input or an automatic input from a sensed workpiece thickness, and which further produces a feedback signal from the LVDTs to retain the roll spacing established by the manual or automatic inputs.

Figure 9:
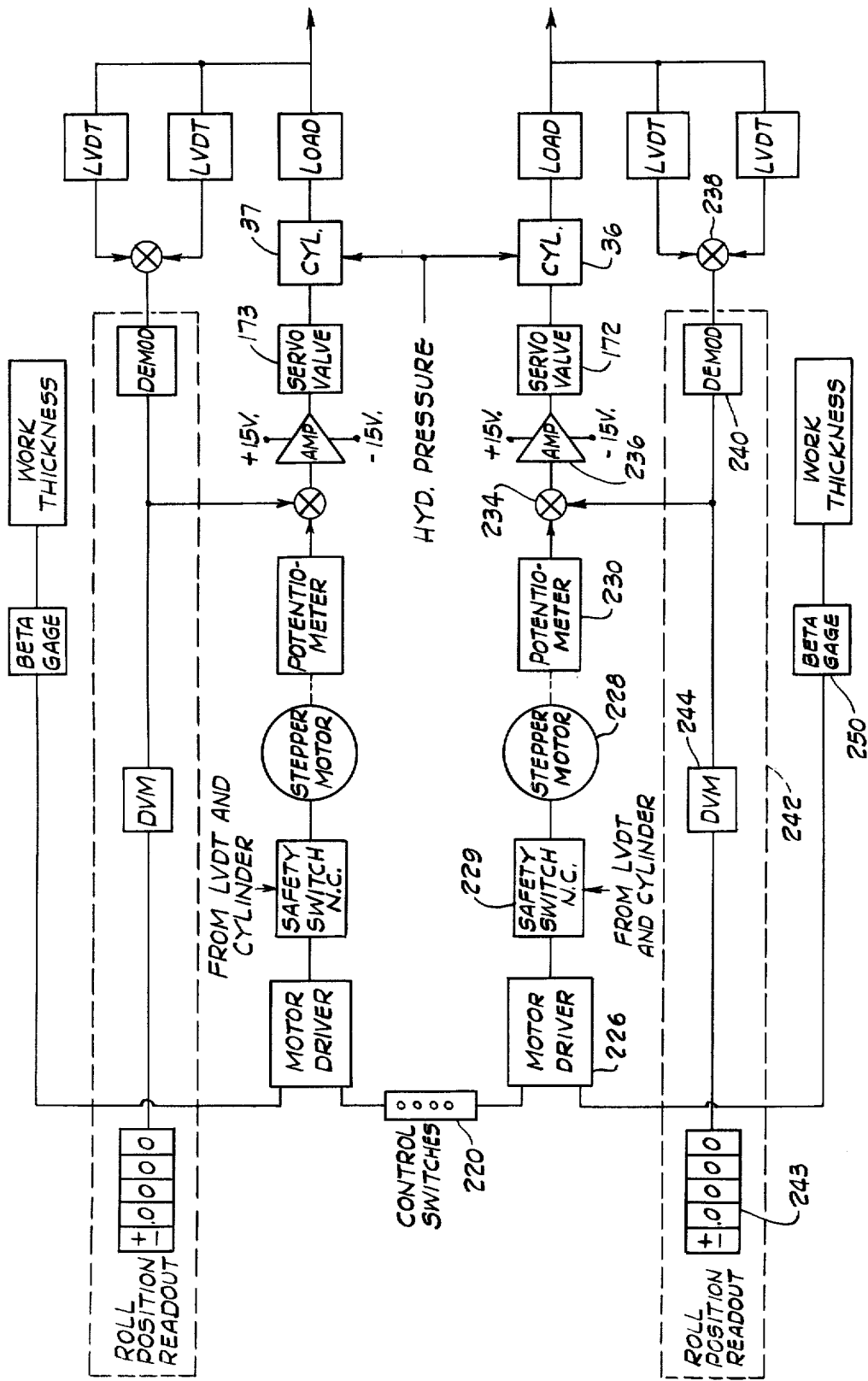

A general arrangement for a suitable control circuit for accurately adjusting and maintaining the position of the movable roll 22 is illustrated in the block diagram of FIG. 9. Individual components comprising the diagram are known per se or the necessary construction is within the skill of the art to accomplish the function indicated.

Manual operation of the apparatus is accomplished through control switches 220 for establishing fast and slow upward and downward movement of the roll 22 (i.e., movement of the rolls apart and together), and the drive rates are adjustable through a rate limiter, which includes rate adjusting potentiometers. As shown in the block diagram, two identical control circuits are operated from the switches, one for each actuator and bearing box of the movable roll, and only one circuit will be described in detail. A logic motor driver 226 operated from a control switch or a control signal from a thickness gauge controls a stepper motor 228. The driver produces a plurality of control pulses and the motor operates in response to those pulses. A normally closed safety switch 229 will stop movement of the roll when opened by preventing further operation of the stepper motor. The stepper motor drives a potentiometer 230, which then establishes a reference voltage, which, at least initially upon an input from the control switches 220, will of course be different from a signal fed back by the LVDTs from a previously established position.

The reference voltage from the potentiometer 230 is compared with an output voltage from the LVDTs on the bearing box 40 by a comparitor 234. This arrangement functions as a negative feedback. In the event there is a voltage differential indicative of a difference between the existing position of the movable roll 22 and the desired position established by the control input from the potentiometer 230, a voltage signal will be produced and will be amplified by an amplifier 236. This signal controls the servo valve 172. The similar circuit controls the servo valve 173 in an identical manner, so that both will operate, but each will be independently controlled from a separate feedback from associated LVDTs on the bearing box being directly affected by the associated hydraulic cylinder 36, 37. Adjustment of the servo valves 172, 173 controls the flow of hydraulic fluid to the cylinders 36, 37 to independently adjust the loads on opposite sides of the movable roll 26. The roll position is detected by the pair of LVDTs associated with each bearing box, and the outputs of the two LVDTs are averaged by a comparitor 238. The output is fed to a demodulator 240, that is part of a signal conditioning and display unit 242, and a voltage indicative of the change in roll position is then introduced to the comparitor 234, compared with the input signal and the roll position adjusted if necessary. The output from the LVDTs further operates a roll position digital readout 243 through a digital volt meter 244.

Once a position of the movable roll 22 is established by manual input through the switches 220, the LVDT voltages will be compared to the reference voltage and will cause a change in the servo valves if the roll position changes, until the LVDTs voltage outputs are brought into conformity with the reference value.

An automatic adjustment feature is provided to sense changes in the workpiece thickness and to adjust the roll spacing if the thickness variation exceeds predetermined limits. This is accomplished through a gauge, for example, a beta gauge 250, that senses the thickness of the workpiece being calendered, downstream from the calender rolls. Beta gauges of this type, which rely upon back scatter radiation, are well known.

When a work thickness is sensed outside the limits established by the thickness guage, an error voltage is produced indicative of the error and is introduced to the motor driver 226 to adjust the stepper motor 228 and thus the potentiometer output 230, thereby setting a new reference level that will accommodate for the error sensed in the workpiece by the gauge. Thus, the roll spacing is maintained at an initial setting through the LVDTs, but the setting is adjustable through the thickness gauge, to accommodate for operating parameters that may affect the workpiece thickness, for example, stock temperature, stock composition, bank size, and calender speed, all of which could in part cause roll deflection not detected by the LVDTs.

Movement of the roll 26 instantaneously follows the stepper motor change, to provide what is known as a high gain system. High speed adjustment of the roll 26 is accomplished by generating pulses from the motor driver 226 at a rapid rate. Each pulse moves the roll 0.0002 inch and the roll can be advanced under high speed at a rate of approximately one-fourth inch per minute.

Figure 10:
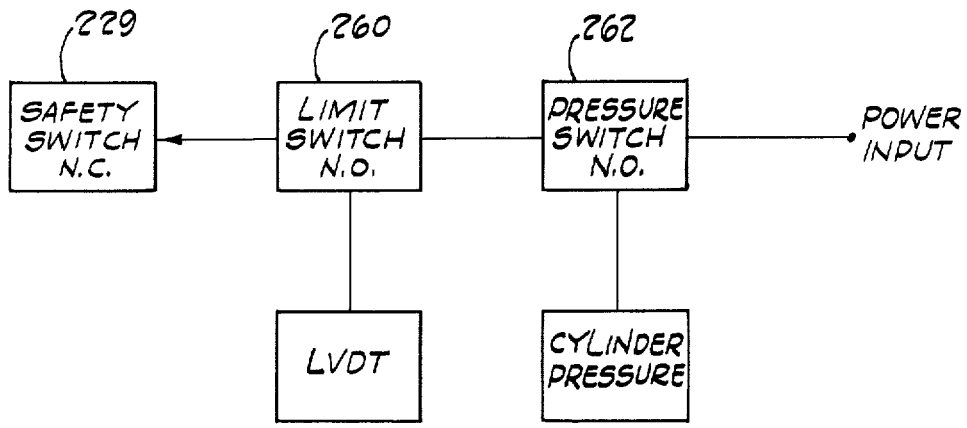
FIG. 10 is a block diagram of a safety circuit for the control circuit of FIG. 9 to prevent roll contact in the absence of work product in the calender.

A safety feature is provided to prevent movement of the roll 26 at a fast speed when the roll is relatively close to the fixed roll, and to prevent the rolls from coming into contact with each other in the event there is no work between the rolls. With reference to FIG. 10, a safety circuit is shown in the block diagram, controlling the safety switch 229 also shown in FIG. 9. The safety switch 229 is operable from an electrical input, when both a normally open limit switch 260 and a normally closed pressure operated switch 262 are closed. The limit switch 260 when closed also prevents high speed travel of the roll 26, through a separate circuit (not shown) of the motor drivers. The limit switch is closed manually by the plunger of one LVDT associated with each bearing box 40. It will be appreciated that a circuit as shown in FIG. 10 is associated with each of the duplicate circuits shown in FIG. 9, which separately control the movement of each bearing box of the movable roll. The LVDT closes the normally open limit switch 260 when the spacing between the rolls reaches 0.030 inch.

The pressure switch 262 in series with the limit switch 260 is maintained normally closed unless there is hydraulic pressure in the cylinder end of each control actuator 36, 37 of a magnitude approximating that experienced when work is located between the calender rolls. As a result of this arrangement, once the calender rolls reach a spacing of 0.030 inch, the roll movement must be resisted by a work product, or the pressure switch 262 will be closed along with the limit switch 260, actuating the safety switch 229 and stopping further advance of the roll.

OPERATION

Although the operation of specific aspects of the invention has been described in connection with the description of the apparatus, the operation is here more fully described. Material M to be formed into a web W by action of the calender rolls 22, 24 is placed in the bite of the two rolls, which are inclined relative to the vertical to facilitate this placement. The rolls 22, 24 are driven in the direction shown by the arrows in FIG. 2A by the electric motors 47, 48 and a web is formed from the material, the thickness of which is dependent upon the spacing between the two rolls. The bottom roll 26, gear driven from the center roll 24, is supplied with a cooling medium and serves to cool the web subsequent to the calendering operation. The web is wound onto a receiving roll, separately driven, and successive windings are separated from each other by a thin web of material that is readily separable from the rubber or plastic web W formed by the calender.

To compensate for roll bending under the pressures applied to the roll by the hydraulic cylinders 36, 37, the movable roll 22 can be arranged with its central rotational axis slightly askew from the axis of the fixed roll 24, by shifting the bearing boxes 40 sideways, about a central axis transverse to the rotational axis. This is accomplished by operating the drive motor and screw 128 against the biasing force of the cylinder and piston 130, on the opposite sides of the frame members. This adjustment is made in opposite directions on opposite ends of the movable roll.

The pullback hydraulic actuators 90, 92 associated with each bearing box of the movable roll are single acting actuators that retain the roll 22 against the ends of the piston rods of the hydraulic cylinders 36, 37 by applying a continual fluid pressure bias. Hydraulic fluid is supplied through an hydraulic pump power unit that also supplies the fluid under pressure to the cylinders 130 of the cross axis adjusting mechanism. Hydraulic systems for applying such pressure in a yieldable manner for biasing purposes are known, and basically use a fluid pressure regulator in the pressure line to an appropriate end of the cylinder to maintain a biasing force, while permitting adjustment of roll spacing or cross axis positioning when sufficient force is exerted in opposition to the biasing force.

The movable roll 22 is adjusted to a desired spacing relative to the fixed roll 24 by the hydraulic actuators 36, 37. The entire range of movement of the movable roll (viz., plus 3.00 inches, minus 0.25 inch) is accomplished by the length of stroke of the piston rods of the hydraulic actuators 36, 37, permitting rapid travel of the movable roll, especially for emergency withdrawal, and at the same time permitting accurate location in a fine adjustment mode.

Roll spacing is established through manual input switches 220, to locate the movable roll 22 at the distance desired from the fixed roll 24. The position is shown by the indicators 243. The workpiece produced by the calender is then measured, and any adjustment necessary is made in the roll spacing through the manual input switches, to produce the desired product thickness. At a given roll spacing set by the operator and resulting in a given set point voltage signal, the LVDTs will produce a feedback signal that will maintain the adjustment system in equilibrium at the spacing set. In the event the movable roll is forced to a different spacing by a workpiece thickness or change in hydraulic pressure, the LVDTs will sense the difference in spacing between the bearing boxes of the movable and fixed rolls and will produce a different output signal, varying from that of the set point reference output. As a result, the servo valves 172, 173 will be actuated to adjust the hydraulic pressure to the actuators, to move the roll 22 in a direction to re-establish the preset spacing. Upon reaching the position, the LVDT output will again match the set point output and the roll position will remain fixed. By sensing the spacing between the bearing boxes with the LVDTs, and utilizing no-clearance bearings for the rolls, an accurate measure of roll spacing, as directly as possible, is obtained to assure a high degree of accuracy in roll spacing.

A further input to the set point value is obtained from an optional gauge, such as the beta gauge 250 that automatically adjusts the set point value in response to work thickness downstream from the rolls.

In the adjustment of the movable roll, as it is moved to approach the fixed roll, the limit switch 260 in an LVDT on each end of the roll stops the fast approach of the roll when the roll spacing is 0.030 inch, automatically switching the rate adjustment from fast to slow. Also, the pressure switch 262 prevents further advance of the movable roll toward the fixed roll at a spacing closer than 0.030 inch in the absence of a minimum pressure on the roll, as sensed by the hydraulic system associated with the actuators 36, 37. This prevents the inadvertent advance of the movable roll into contact with the fixed roll, which would damage the machine.

In the event of a power failure, the emergency valve 168 of the hydraulic system is shifted to supply fluid from the reservoir 169, which then separates the movable roll from the fixed roll by a distance of one-tenth inch and holds it there. Because of the all hydraulic actuation of the movable roll, there is no necessity to drive a screw for retracting the roll, and it can therefore be conveniently and rapidly moved to a withdrawn position. Upon the reapplication of electrical power, a restart circuit automatically adjusts the set point of the movable roll to conform to the position to which the roll has been spaced under the emergency pressure from the reservoir, so that the roll will not be immediately driven down into contact with the work, prior to the complete reestablishment of operation.

ALTERNATIVE LVDT ARRANGEMENT

As shown in FIG. 11, an LVDT 275 is supported between journal positions 276, 278 at opposite ends of rolls 22', 24', which correspond to rolls 22, 24 previously described. The rolls 22', 24' are journaled at each end by the bearing boxes 40, 46. Since the construction at opposite ends is identical only the ends shown in FIG. 11 will be described in detail. The journal portions 276, 278, which are of reduced diameter, extend inwardly of the bearing boxes, providing a space 280 adjacent the bearing boxes in which the LVDT 275 is located, oriented to extend in a plane common to the axes of the two rolls so that it will sense a change in roll spacing.

A mounting ring 282, 283 is secured to and encircles each journal portion 276, 278, and carries a circular saddle bearing 286, 287. The bearings 286, 287 are aligned in a plane in which the axis of the LVDT lies. A bracket 290 from the inwardly facing surface of the bearing box 46 supports the housing 291 of the LVDT in contact with the bearing 286. The bracket is flexible enough to permit slight movement of the LVDT housing relative to the bearing box 46 to accommodate any roll bending and to maintain the end of the housing 291 against the surface of bearing 286. The plunger portion 294, biased outwardly from the housing portion 291, rides against the bearing 287.

With this arrangement a change in roll spacing is directly sensed by the LVDTs at each end without involving the bearing boxes and eliminating any error that might be introduced by a lack of perfect correlation between roll movement or spacing and bearing box movement or spacing.

While it will be appreciated that a preferred embodiment and mode of operation have been described in detail, various modifications or alterations may be made therein without departing from the spirit and scope of the invention, set forth in the appended claims.

What is claimed is:

1. A calender comprising:
   first and second cooperating rolls,
   means including a frame and frame supported bearing boxes supporting the rolls at each end for rotation and supporting the first roll for movement toward and away from the second,
   hydraulic means for changing the spacing between said rolls and for applying pressure to the first roll and thence to material between the rolls,
   said hydraulic means comprising a double acting fluid cylinder and reciprocable piston at opposite ends of said first roll acting between the bearing boxes of said first roll and said frame,
   each said cylinder and piston having a stroke as great as the total distance through which said first roll is movable,
   fluid actuators connected between said frame and the bearing boxes of the movable first roll to bias the first roll against said hydraulic means,
   means including two linear voltage differential transformers carried on each bearing box of one of said first and second cooperating rolls acting between the bearing boxes of said first and second rolls, sensitive to changes in the bearing box positions of said first and second rolls relative to each other for providing a signal indicative of roll spacing, the two transformers on each box being located on opposite sides of and equidistant from the axis of the carrying roll in a direction that extends at right angles to the direction of relative movement between the rolls, and means for actuating said hydraulic means in response to said signal, to adjust the roll spacing.

2. A calender comprising:

first and second cooperating rolls, means including a frame and frame supported bearing boxes supporting the rolls at each end for rotation and supporting the first roll for movement toward and away from the second, hydraulic means for changing the spacing between said rolls and for applying pressure to the first roll and thence to material between the rolls, said hydraulic means comprising a double acting fluid cylinder and reciprocable piston at opposite ends of said first roll acting between the bearing boxes of said roll and said frame, each said cylinder and piston having a stroke as great as the total distance through which said first roll is movable, fluid actuators connected between said frame and the bearing boxes of the movable first roll to bias said first roll against said hydraulic means, said fluid actuators comprise two cylinder and piston motors connected to each bearing box, one on each opposite axially spaced side thereof, and a yoke associated with each actuator, connected to the associated side of the bearing box at spaced locations equidistant from the axis of the journalled roll in a direction that extends at right angles to the direction of movement of the bearing box, means including two linear variable differential transformers carried on each bearing box of one of said first and second cooperating rolls acting between the bearing boxes of said first and second rolls, sensitive to changes in the bearing box positions of said first and second rolls relative to each other for providing a signal indicative of roll spacing, the two transformers on each box being located on opposite sides of and equidistant from the axis of the carrying roll in a direction that extends at right angles to the direction of relative movement between the rolls, and means for actuating said hydraulic means in response to said signal, to adjust the roll spacing.

3. A calender comprising:

first and second cooperating rolls, means including a frame and frame supported bearing boxes supporting the rolls at each end for rotation and relative movement twoard and away from one another, said bearing boxes including roller bearings journaling said rolls, said roller bearings providing essentially no clearance between the roll and respective bearing box at operating temperatures of the bearings and rolls, hydraulic means for changing the spacing between said rolls and for applying pressure to at least one of the rolls and thence to material between the rolls, said hydraulic means comprising a double acting fluid cylinder and reciprocable piston at opposite ends of a movable one of said rolls acting between the bearing boxes of said roll and said frame, each said cylinder and piston having a stroke as great as the total distance through which said rolls are relatively movable, fluid actuators connected between said frame and the bearing boxes of the movable first roll to bias the first roll against said hydraulic means, roller bearings between said frame and the bearing boxes at opposite ends of the movable roll, that act in the direction of roll movement, said bearings serving to substantially reduce breakaway friction during roll spacing adjustment, means including a transducer acting between the first and second rolls, sensitive to changes in the positions of said first and second rolls relative to each other for providing a signal indicative of roll spacing, and means for actuating said hydraulic means in response to said signal, to adjust the roll spacing.

4. A calender comprising:

first and second cooperating rolls, means including a frame and frame supported bearing boxes supporting the rolls at each end for rotation and relative movement toward and away from one another, hydraulic means for changing the spacing between said rolls and for applying pressure to at least one of the rolls and thence to material between the rolls, said hydraulic means comprising a double acting fluid cylinder and reciprocable piston at opposite ends of a movable one of said rolls acting between the bearing boxes of said roll and said frame, each said cylinder and piston having a stroke as great as the total distance through which said rolls are relative movable, means including a transducer continuously sensitive to the spacing of the rolls for providing a signal indicative of roll spacing, and means for actuating said hydraulic means in response to said signal, to adjust the roll spacing, said actuating means including a hydraulic system and a valve automatically operable in the event of power failure, to control the supply of hydraulic fluid to said double acting fluid cylinder and reciprocable piston to positively drive the piston in a reverse direction from that in which pressure is applied to material between the rolls and separate the first and second rolls in the event of a power failure, said hydraulic system including means for storing hydraulic fluid under pressure for release by said valve.

5. A calender comprising:

first and second cooperating rolls, means including a frame and frame supported bearing boxes supporting the rolls at each end for rotation and relative movement toward and away from one another, hydraulic means for changing the spacing between said rolls and for applying pressure to at least one of the rolls and thence to material between the rolls, said hydraulic means comprising a double acting fluid cylinder and reciprocable piston at opposite ends of a movable one of said rolls acting between the bearing boxes of said roll and said frame, each said cylinder and piston having a stroke as great as the total distance through which said rolls are relatively movable, means including a transducer continuously sensitive to the spacing of the rolls for providing a signal indicative of roll spacing, means for actuating said hydraulic means in response to said signal, to adjust the roll spacing, and an electrical control circuit, including a limit switch responsive to the approach of the first and second rolls into close proximity and a pressure switch responsive to the hydraulic operating pressure of said double acting fluid cylinder, that stop the operation of said hydraulic means in the absence of resistance to the movement of said rolls into close proximity.

6. A calender comprising:

first and second cooperating rolls, means including a frame and frame supported bearing boxes supporting the rolls at each end for rotation and relative movement toward and away from one another, hydraulic means for changing the spacing between said rolls and for applying pressure to at least one of the rolls and thence to material between the rolls, said hydraulic means comprising a double acting fluid cylinder and reciprocable piston at opposite ends of a movable one of said rolls acting between the bearing boxes of said roll and said frame, each said cylinder and piston having a stroke as great as the total distance through which said rolls are relatively movable, means, including a transducer acting directly between opposed rotatable surface portions of said first and second rolls inwardly of the bearing boxes, sensitive to change in the spacing between said surface portions for providing a signal indicative of roll spacing, and means for actuating said hydraulic means in response to said signal, to adjust the roll spacing.

7. A calender comprising:

first and second cooperating rolls, means including a frame and frame supported bearing boxes supporting the rolls at each end for rotation and relative movement toward and away from one another, said bearing boxes including roller bearings journaling said rolls, said roller bearings providing essentially no clearance between the roll and respective bearing box at operating temperatures of the bearings and rolls, hydraulic means for changing the spacing between said rolls and for applying pressure to at least one of the rolls and thence to material between the rolls, said hydraulic means comprising a double acting fluid cylinder and reciprocable piston at opposite ends of a movable one of said rolls acting between the bearing boxes of said roll and said frame, each said cylinder and piston having a stroke as great as the total distance through which said rolls are relatively movable, fluid actuators connected between said frame and the bearing boxes of the movable first roll to bias the first roll against said hydraulic means, roller bearings between said frame and the bearing boxes at opposite ends of the movable roll, that act in the direction of roll movement, said bearings serving to substantially reduce breakaway friction during roll spacing adjustment, means including two linear variable differential transformers carried on each bearing box of one of said first and second cooperating rolls acting between the bearing boxes of said first and second rolls, sensitive to changes in the bearing box positions of said first and second rolls relative to each other for providing a signal indicative of roll spacing, the two transformers on each box being located on opposite sides of and equidistant from the axis of the carrying roll in a direction that extends at right angles to the direction of relative movement between the rolls, and means for actuating said hydraulic means in response to said signal, to adjust the roll spacing.

* * * * *